(12) United States Patent
Nathans

(10) Patent No.: US 10,709,293 B1
(45) Date of Patent: Jul. 14, 2020

(54) HEIGHT ADJUSTABLE GRILLING ACCESSORY

(71) Applicant: Mark George Nathans, Gilbert, AZ (US)

(72) Inventor: Mark George Nathans, Gilbert, AZ (US)

(*) Notice: Subject to any disclaimer, the term of this patent is extended or adjusted under 35 U.S.C. 154(b) by 254 days.

(21) Appl. No.: 15/901,733

(22) Filed: Feb. 21, 2018

Related U.S. Application Data

(60) Provisional application No. 62/498,471, filed on Dec. 23, 2016.

(51) Int. Cl.
*A47J 37/07* (2006.01)

(52) U.S. Cl.
CPC ....... *A47J 37/0786* (2013.01); *A47J 37/0763* (2013.01); *A47J 2037/0795* (2013.01)

(58) Field of Classification Search
CPC ............... A47J 37/0786; A47J 37/0763; A47J 2037/0795
See application file for complete search history.

(56) References Cited

U.S. PATENT DOCUMENTS

| 2,058,172 A | * | 10/1936 | Myers | ................ | A47J 37/0763 |
| | | | | | 126/25 R |
| 6,439,111 B1 | * | 8/2002 | Lu | ....................... | A47J 37/0763 |
| | | | | | 126/25 R |
| 2004/0016349 A1 | * | 1/2004 | Robertson | ............... | A47J 33/00 |
| | | | | | 99/449 |

* cited by examiner

*Primary Examiner* — Sarang Afzali
*Assistant Examiner* — Ruth G Hidalgo-Hernandez
(74) *Attorney, Agent, or Firm* — Plager Schack LLP; Mark H. Plager; Kara Verryt

(57) ABSTRACT

A grilling accessory for moving a cooking surface vertically up and down with respect to a heat source may include a rack holder subassembly designed to be positioned proximate to a heat source, a grilling rack subassembly designed to support food items and engage with the rack holder subassembly, and, optionally, a dish subassembly designed to accommodate the heat source. The rack holder subassembly may include a base frame; at least two arms extending from the base frame; and a plurality of grill rack supports extending from each of the at least two arms. The grilling rack subassembly may include a grill grate with grilling bars; and a pair of hangers extending from the grill grate, the pair of hangers designed to engage with the plurality of grill rack supports.

12 Claims, 12 Drawing Sheets

HEIGHT ADJUSTABLE GRILLING ACCESSORY

RELATED APPLICATION

This application claims priority to provisional patent application U.S. Ser. No. 62/498,471 filed on Dec. 23, 2016, the entire contents of which is herein incorporated by reference.

BACKGROUND

The embodiments herein relate generally to grilling accessories, and more particularly, to a grilling accessory for adjusting the vertical height of a cooking surface over a heat source.

When cooking food over a heat source, it is necessary to control the food temperatures for adequate cooking. This can be difficult when cooking over, for example, charcoal because of the inability to easily control to temperature of the charcoal. Moreover, it is difficult to feed the fire when grilling food over charcoal.

Existing charcoal grills include a kettle or bowl designed to hold the fire and a grilling rack that covers the bowl. The fire is started and then the rack is placed over the top edge of the bowl when the fire is ready to grill the food items. The food items are then placed over the rack and turned over a few times until cooking is complete. Thus, a user is required to wait until the fire has reached a particular temperature to start cooking.

To vary the cooking temperature, a user may blow on the charcoal, strengthening the fire and increasing the heat, or wait for the charcoal has cooled down. These are not efficient ways to vary the cooking temperature. Furthermore, while adding charcoal may be desirable, this is not possible without removing the rack on conventional charcoal grills.

Therefore, what is needed is a device that allows a user to move food vertically up and down with respect to the heat source, wherein the device is stable and easily collapsible for storage and transportation.

SUMMARY

Some embodiments of the present disclosure include a grilling accessory for moving a cooking surface vertically up and down with respect to a heat source. The grilling accessory may include a rack holder subassembly designed to be positioned proximate to a heat source, a grilling rack subassembly designed to support food items and engage with the rack holder subassembly, and, optionally, a dish subassembly designed to accommodate the heat source. The rack holder subassembly may include a base frame; at least two arms extending from the base frame; and a plurality of grill rack supports extending from each of the at least two arms. The grilling rack subassembly may include a grill grate with grilling bars; and a pair of hangers extending from the grill grate, the pair of hangers designed to engage with the plurality of grill rack supports.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
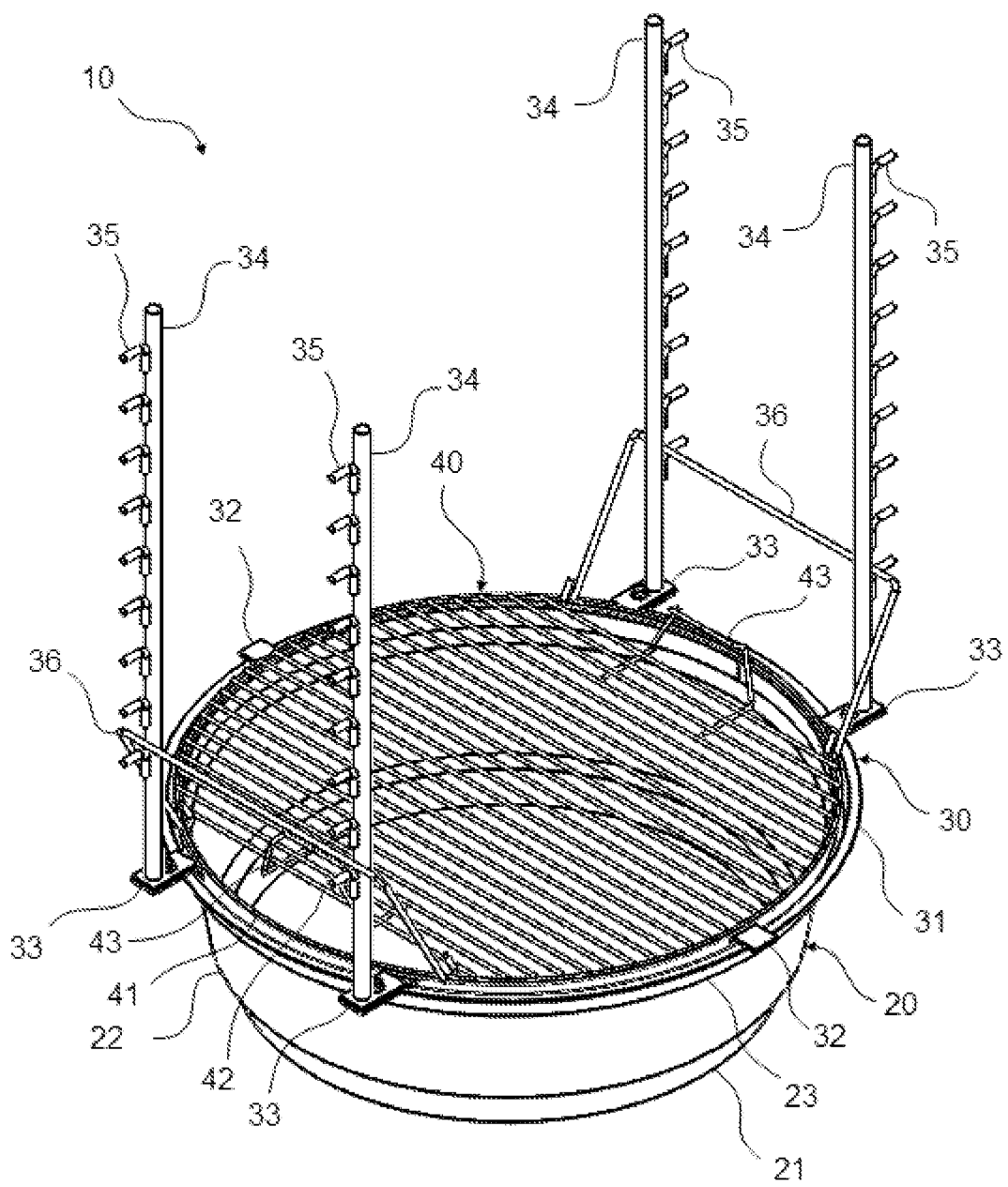
FIG. 1 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an adjustable cooking surface and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Rack Holder Subassembly
    b. Grilling Rack Subassembly

The various elements of the device of the present disclosure may be related in the following exemplary fashion. It is not intended to limit the scope or nature of the relationships between the various elements and the following examples are presented as illustrative examples only.

By way of example, and referring to FIGS. 1-12, some embodiments of the present disclosure include a grilling accessory 10 for moving a cooking surface vertically up and down with respect to a heat source, the grilling accessory 10 comprising a rack holder subassembly 30 designed to engage with a heat source, and a grilling rack subassembly 40 designed to support food items and engage with the rack holder subassembly 30. The grilling accessory 10 may also comprise a dish subassembly 20 designed to accommodate the heat source, such as charcoal, wherein the rack holder subassembly 30 engages, such as removably engages, with the dish subassembly 20.

In embodiments, the dish subassembly 20 may comprise a kettle, bowl, or dish comprising a dish bottom 21, a dish wall 22 extending upward from the dish bottom 21, and a dish lip 23 defining the top edge of the dish wall 22. Thus, the dish subassembly 20 may comprise a conventional charcoal kettle or bowl. In some embodiments, an alternate dish subassembly 70 may further comprise legs 71 extending from a bottom surface of the dish bottom 21.

More specifically, the rack holder subassembly 30 may comprise a base frame 31 and at least two arms 34 extending from the base frame 31, the at least two arms 34 each comprising grill rack supports. For example, as shown in FIGS. 1-5 and 8, each arm 34 may comprise a plurality of hooks 35 extending outward, such as substantially perpendicularly outward, therefrom, wherein the hooks 35 define the grill rack supports. The arms 34 may each connect to the base frame 31 using any suitable or desired connection and, in some embodiments, a plurality of fixtures 33 extend outwardly from the base frame 31, and each arm 34 extends substantially perpendicularly upward from a respective fixture 33.

Figure 5:
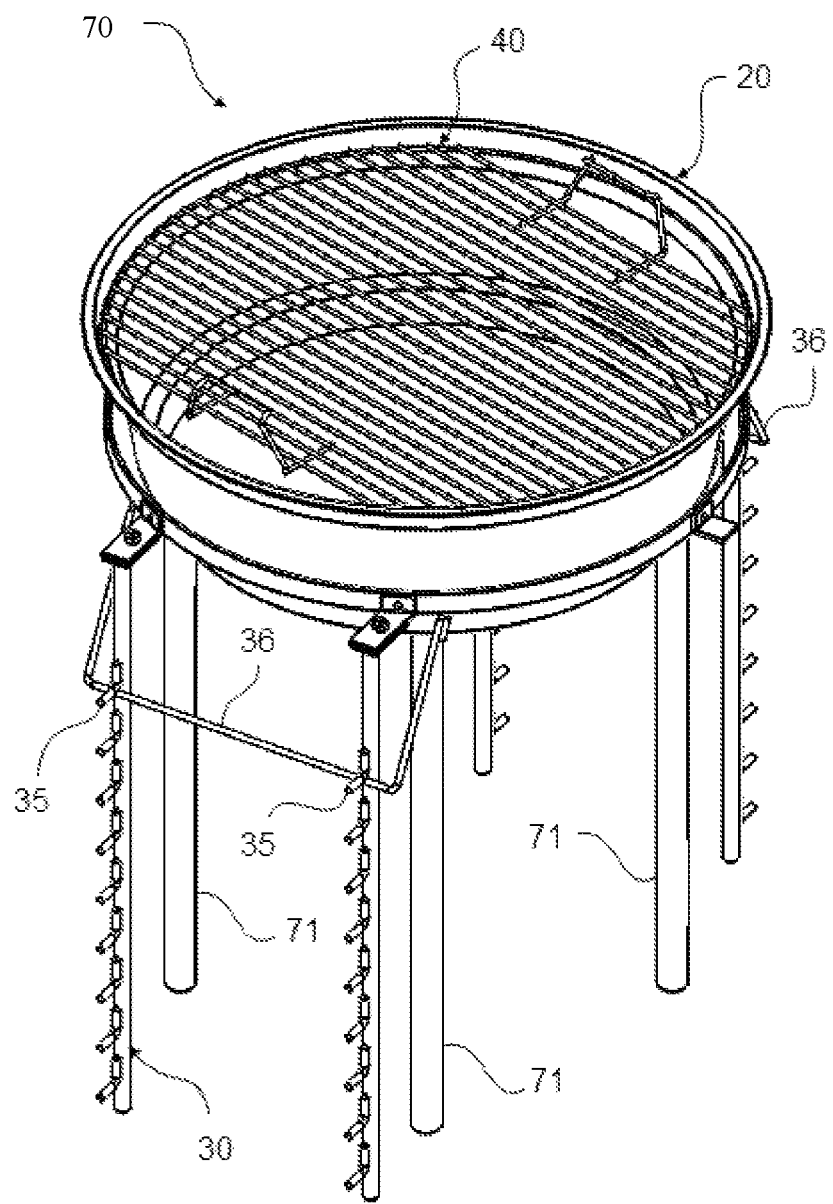
FIG. 5 is a perspective view of one embodiment of the present disclosure.
Figure 6:
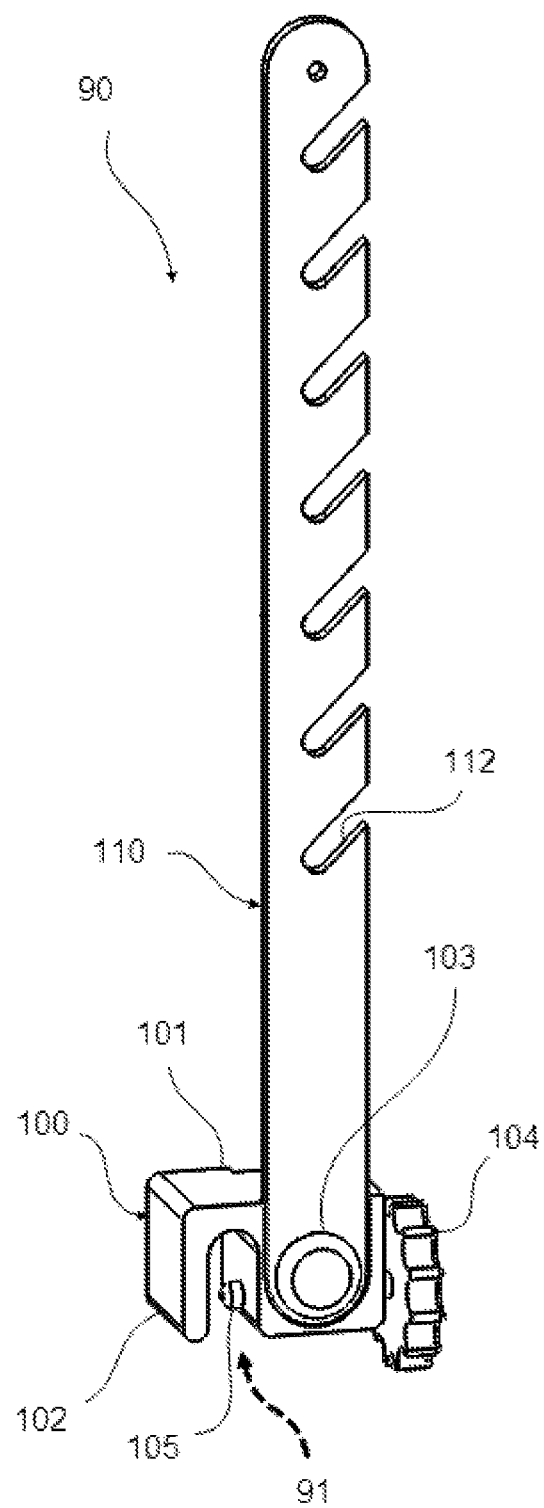
FIG. 6 is a perspective view of one embodiment of the present disclosure.
Figure 9:
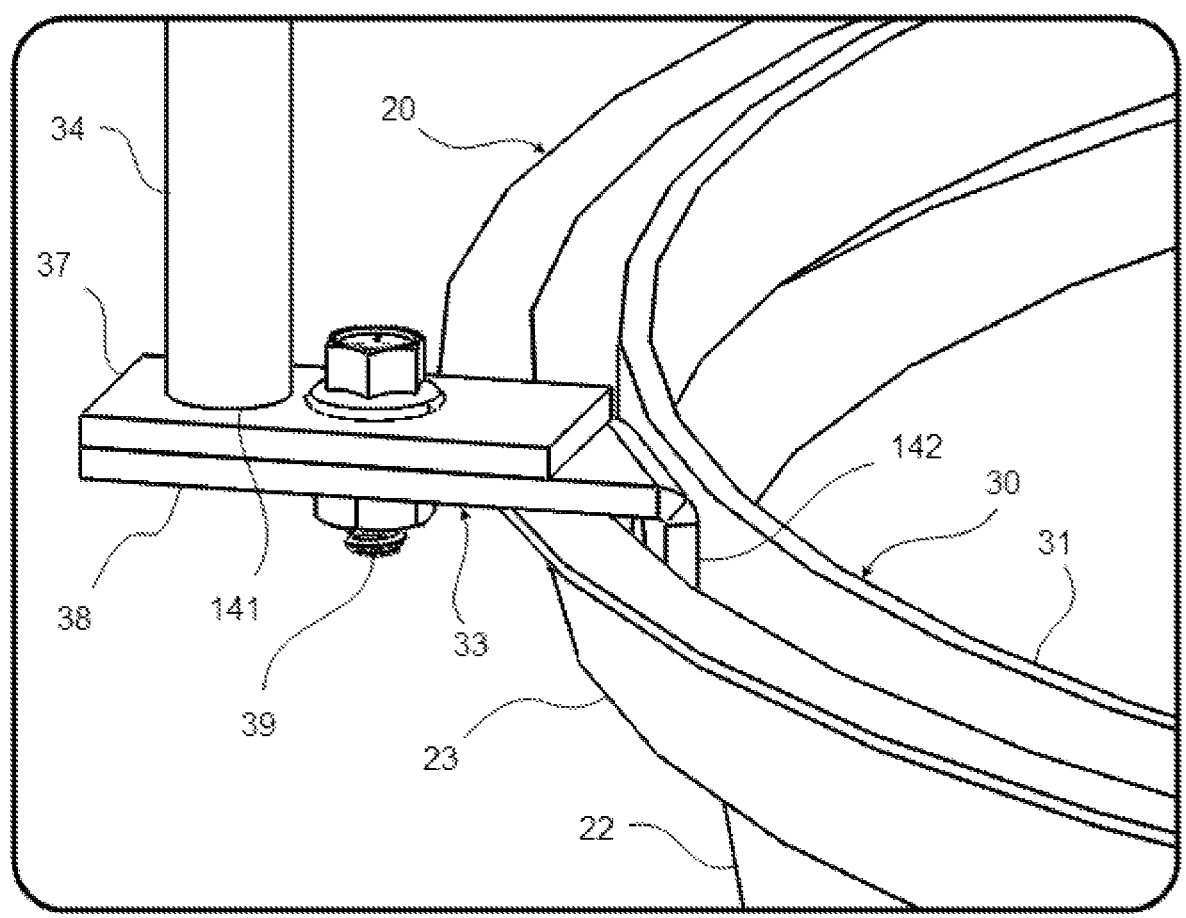
FIG. 9 is a perspective view of one embodiment of the present disclosure.

As shown in more detail in FIG. 9, a bottom of the arm 34 may be permanently attached to a base plate 37 at arm/plate junction 141. The fixture 33 may comprise a clip plate 38 permanently attached to, and extending outwards from, the base frame 31 at clip/ring junction 142. The base plate 37 may be attached, such as removably attached, to the clip plate 38 using any suitable fastener. For example, each of the base plate 37 and the clip plate 38 may include a fastener orifice extending therethrough, wherein the base plate 37 and the clip plate 38 may be attached via a bolt 39 extending through the fastener orifices. As such, the arms 34 may be positioned to extend substantially perpendicularly upward from the base frame 31, as shown in FIGS. 1-4, or, for storage purposes, the arms 34 may be positioned to extend substantially perpendicularly downward from the base frame 31, as shown in FIG. 5. The positioning of the arms 34 may be manipulated by removing the bolt 39, positioning the arms 34 as desired, and reinserting the bolt 39.

The rack holder subassembly 30 may further comprise extensions 32 extending outward from the base frame 31. As such, the rack holder subassembly 30 may simply be rested on top of the dish lip 23 of the dish subassembly 20.

Alternatively, the rack holder subassembly may comprise a plurality of plate rack holders 90 designed to engage with the dish lip 23. For example, the plate rack holder 90 may comprise a blade 110 with a plurality of recesses 112, such as angled recesses, sized to accommodate the grill rack subassembly. The blade 110 may extend upward from a fastener, such as a vise clip 100, designed to engage with the dish lip 23. In some embodiments, the blade 110 may be attached to the vise clip 100 via bolt 103. The vise clip 100 may comprise a clip body 101 including a clip body lip 102 defining a slot 91 sized to accommodate the dish lip 23. A screw 105 may extend through the clip body 101 into the slot 91, wherein an end of the screw 105 distal from the slot 91 may comprise a knob 104, such that when the knob 104 is rotated, the screw 105 extends further into or out of the slot 91, thus allowing the screw 105 to secure the dish lip 23 within the slot 91.

Figure 7:
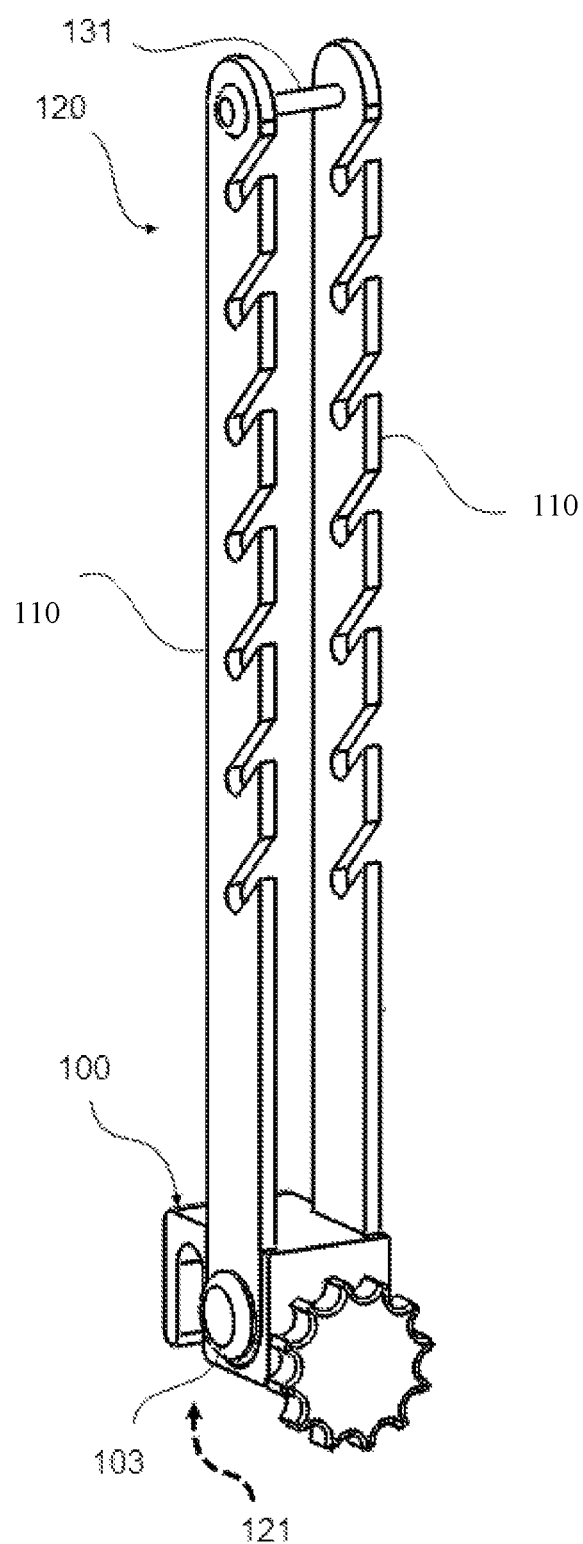
FIG. 7 is a perspective view of one embodiment of the present disclosure.

As shown in FIG. 7, an alternate plate rack holder 120 may comprise a plurality of blades 110 attached to the vise clip 100 with slot 121 sized to accommodate the dish lip 23, wherein an end of each blade 110 distal from the vise clip 100 may be attached to each adjacent blade 110 via a pin 131.

Figure 10:
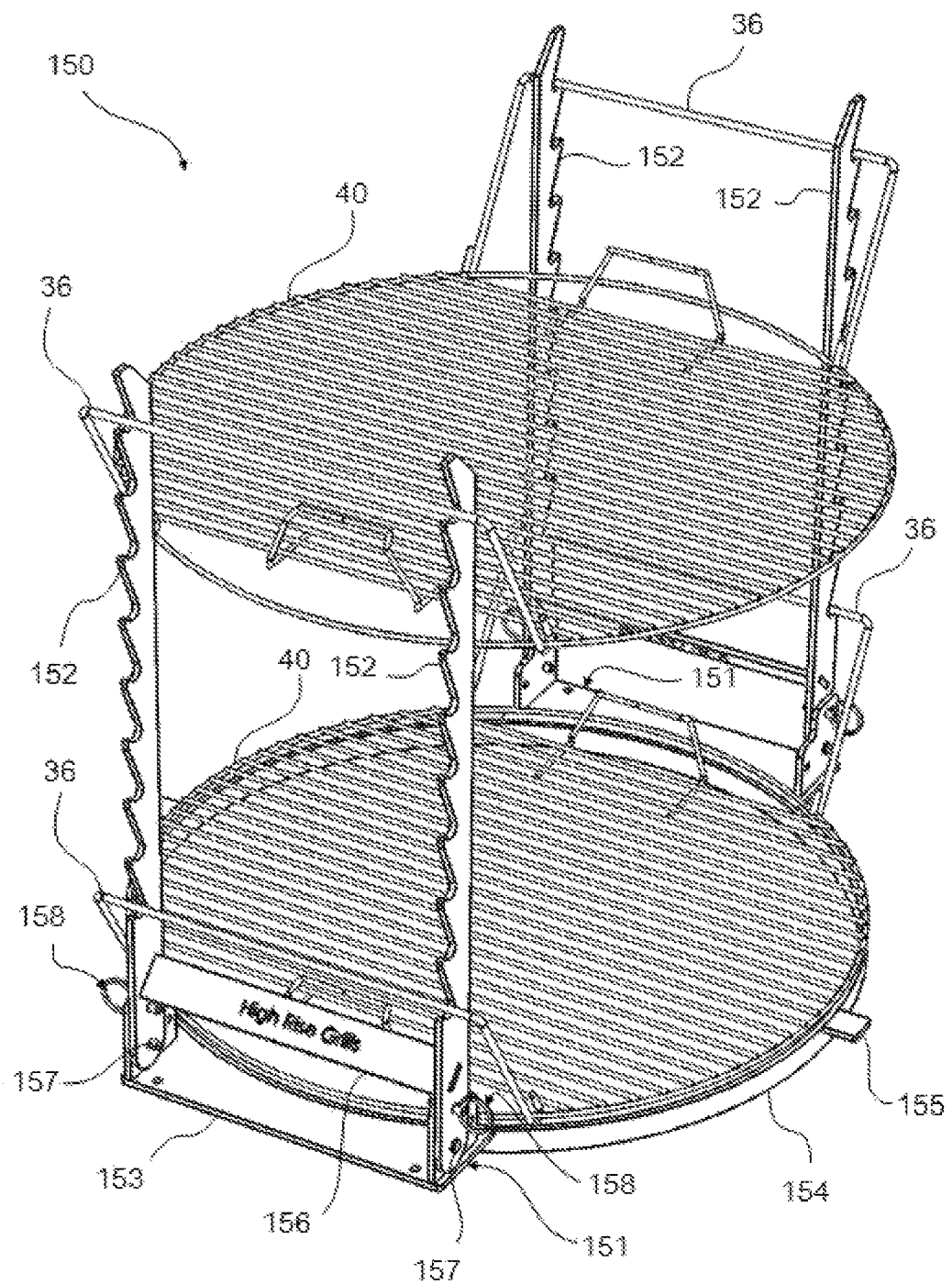
FIG. 10 is a perspective view of one embodiment of the present disclosure.
Figure 11:
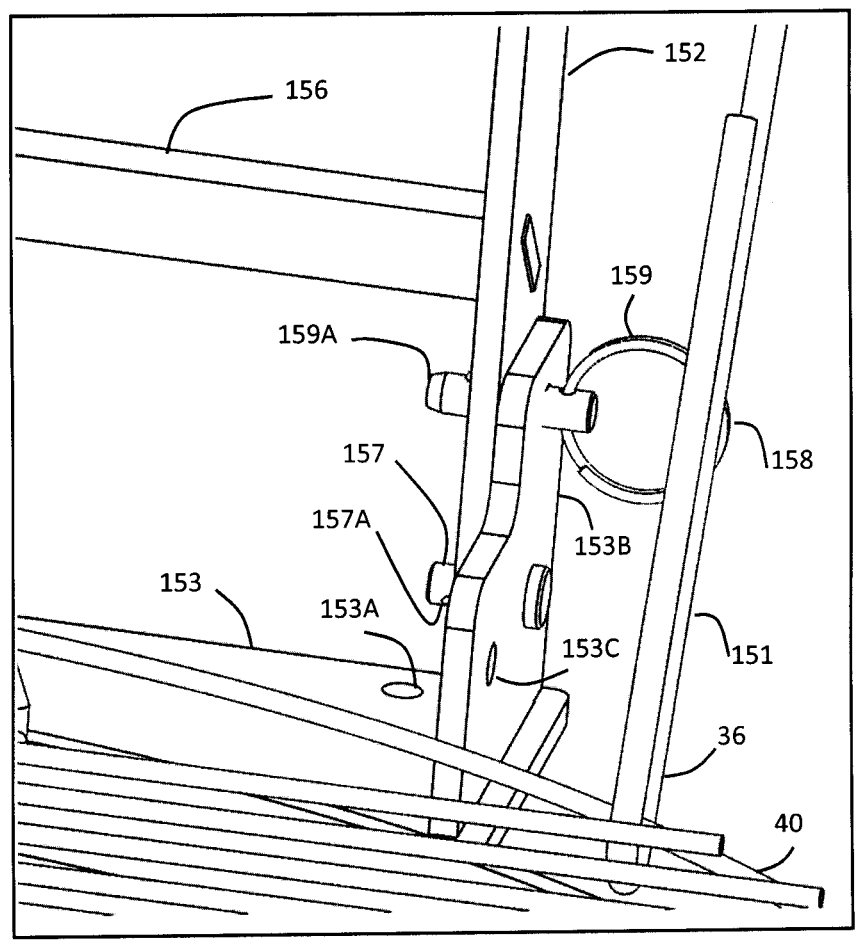
FIG. 11 is a perspective view of one embodiment of the present disclosure.
Figure 12:
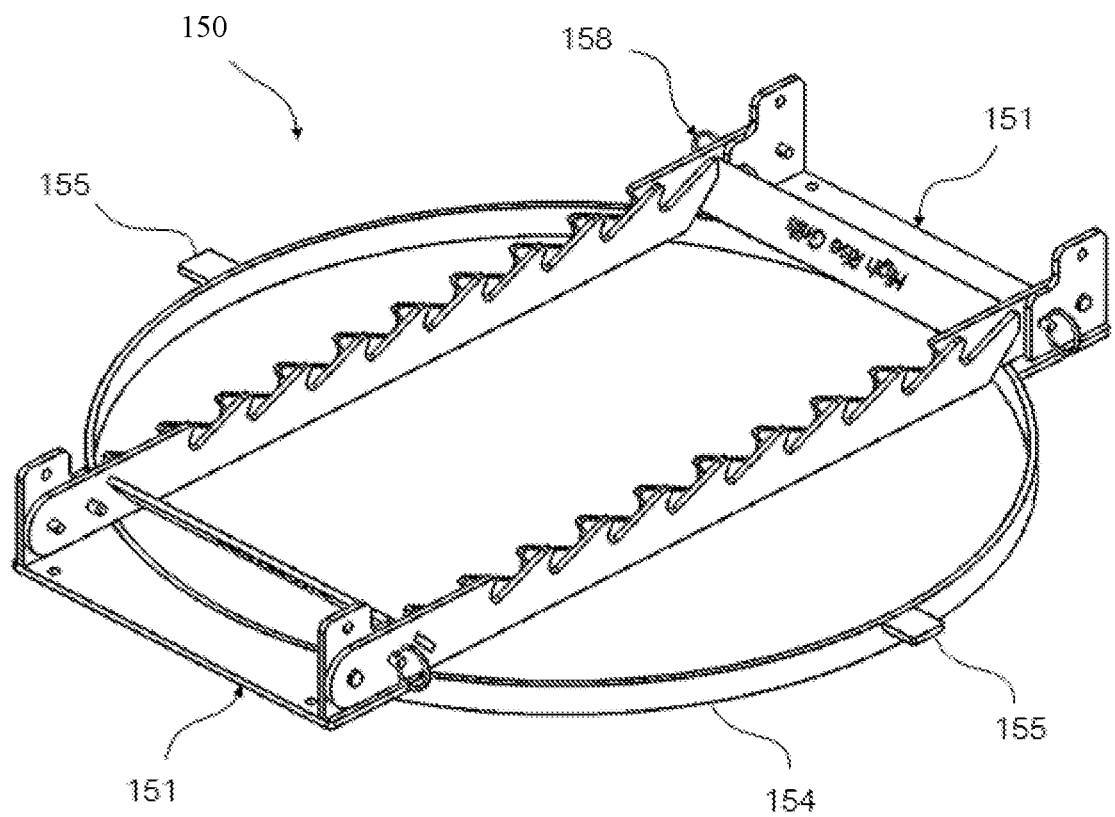
FIG. 12 is a perspective view of one embodiment of the present disclosure.

In yet a further version of the grilling assembly 150, as shown in FIGS. 10-12, the rack holder subassembly may comprise a base frame 154 with a plurality of extensions 155 extending therefrom, and at least two holder tower assemblies 151 attached to the base frame 154. As shown in the Figures, each holder tower assembly 11 may comprise a pair of notched holder arms 152 extending from a base plate 153. The holder arms 152 may be hingeably attached to the base plate 153, such as by hinge pin 157 designed to pass through orifice 157A, and may be locked into place using lock pin assembly 158. A stiffener plate 156 may extend between the pair of holder arms 152 proximate to the base plate 153. In embodiments, the stiffener plate 156 may have a logo applied thereto. As shown in FIG. 11, the base plate 153 may comprise a plate orifice 153A, which may be used to engage with fasteners on a wall (not shown) extending therethrough. Additionally, the base plate 152 may include a pair of plates 153B extending upward from an outer edge of the base plate 153. Each plate 153B may comprise a pair of pin orifices 153C designed to engage with a lock pin assembly 158 comprising a pull ring 159 inserted into shank 159A. The first pin orifice may be used to lock the holder arm 152 in an upright position, as shown in FIG. 11, while the second pin orifice 153C may be used to secure the holder arm 152 in a folded down position, as shown in FIG. 12. While not shown in the Figures, the lock pin assembly 158 may further comprise a cable, such as a short aircraft cable, tethering the ring 158 to a push pin.

The grilling rack subassembly 40 may comprise a grill grate comprising a perimeter ring 41 and grilling bars 42 positioned within the perimeter ring 41 and a pair of hangers 36 extending from the grill grate. The hangers 36 may comprise an elongate bar extending between a pair of arms, wherein the elongate bar is designed to rest on or engage with the grill rack supports (either the hooks 34, recesses 112, notched holder arms 152, or the like) on the rack holder subassembly. The grilling rack subassembly 40 may further comprise at least one handle 43 extending therefrom. The hangers 36 may be hingeably attached to the grill grate.

Figure 2:
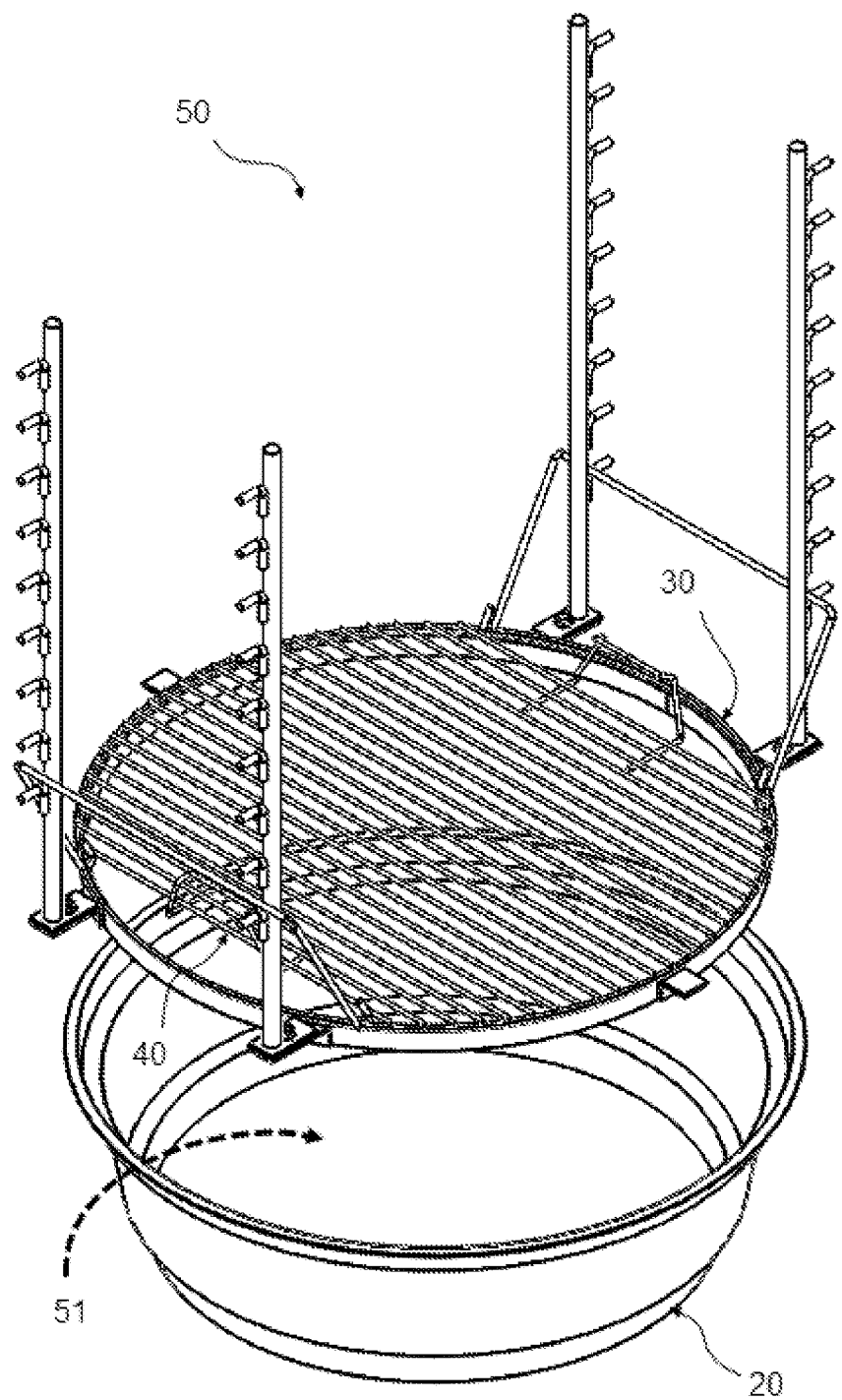
FIG. 2 is a perspective view of one embodiment of the present disclosure.
Figure 3:
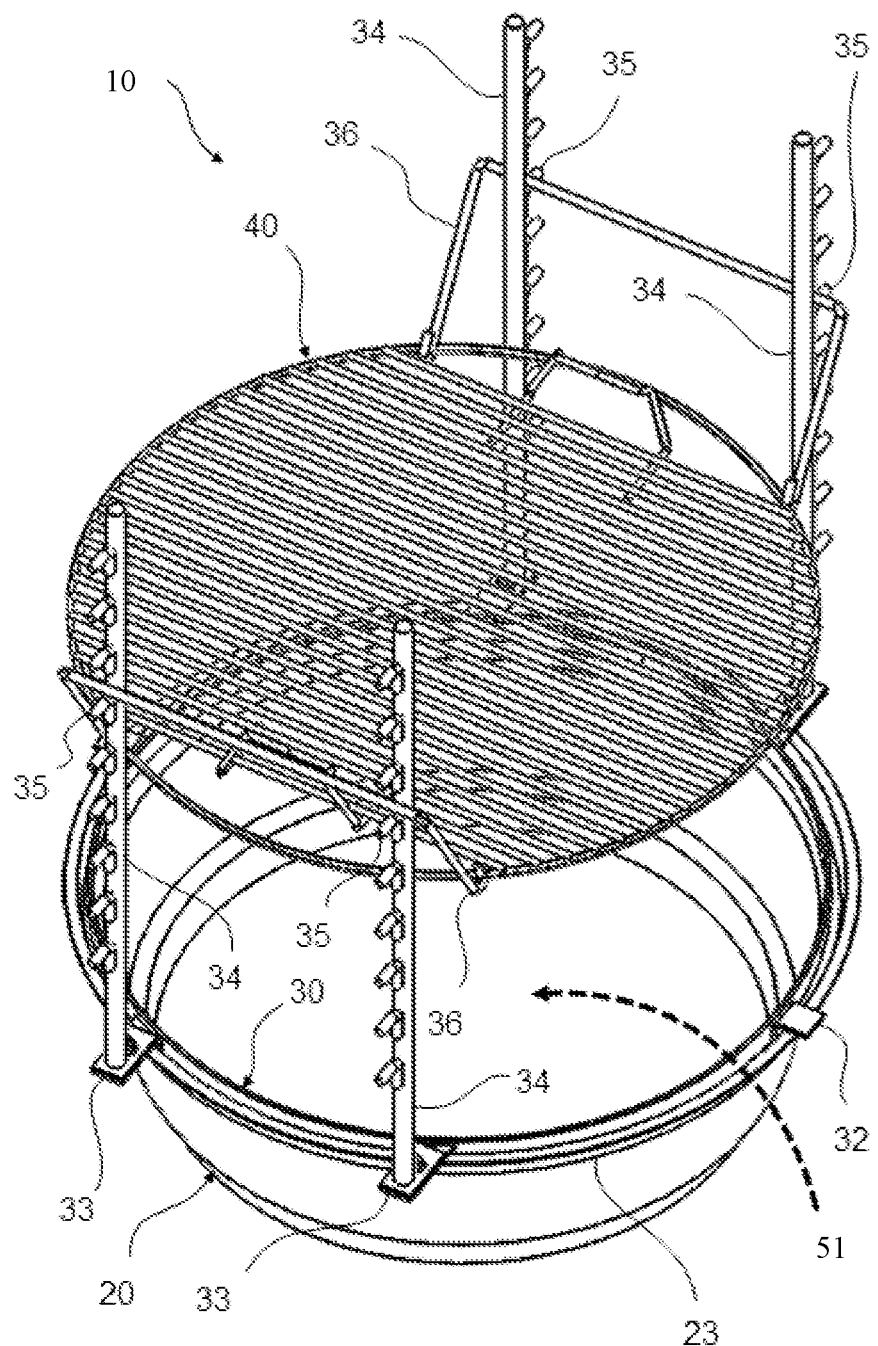
FIG. 3 is a perspective view of one embodiment of the present disclosure.
Figure 4:
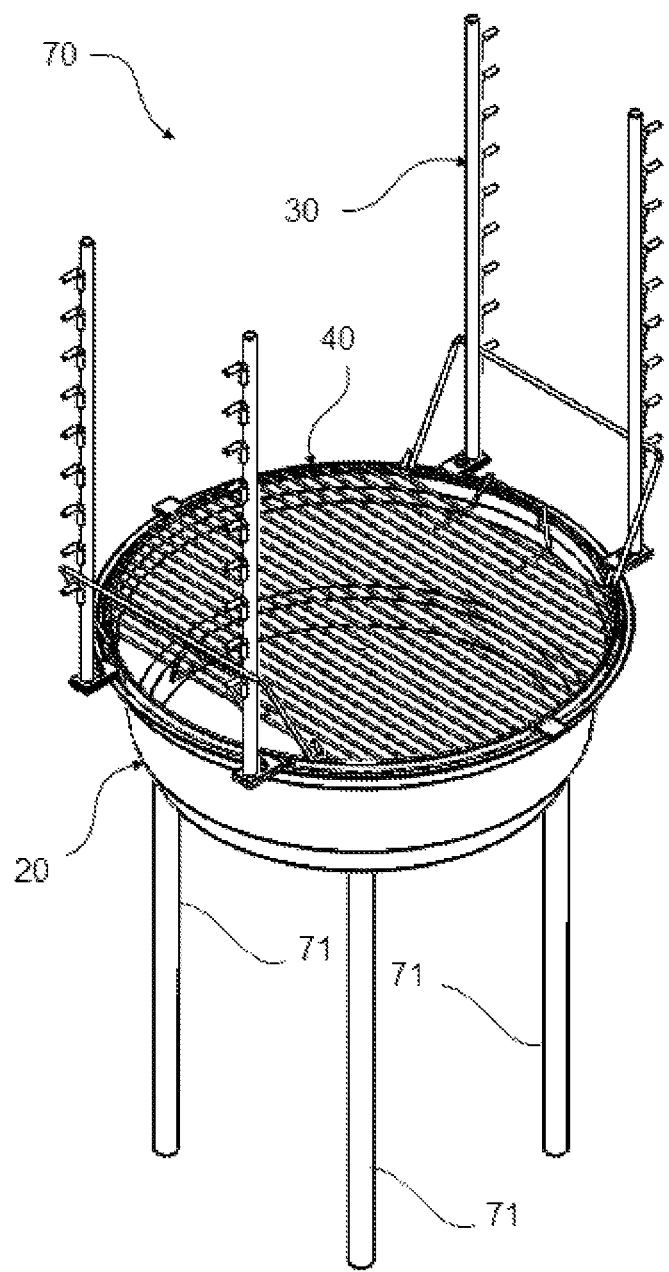
FIG. 4 is a perspective view of one embodiment t of the present disclosure.

To use the device of the present disclosure, the rack holder subassembly may be engaged with a heat source. For example, in the case of a charcoal grill, the base frame may be placed onto the charcoal bowl, kettle, or dish such that the extensions support the base frame thereon. The arms may be positioned to extending substantially upward from the heat source. The hangers 36 may be engaged with the grill rack supports by gravity. As shown in FIG. 1, the grilling rack subassembly 40 may be positioned such that the grilling bars 42 are substantially parallel to a plane of the top surface of the dish and proximate to the dish. To vary the heat application to the food placed on the grilling bars 42, the grill rack subassembly 40 may be simply moved upwards or downwards by engaging the hangers 36 with different grill rack supports along a length of the arms. Moreover, if fire feeding 51 is needed or desired, positioning the grill rack subassembly 40 further up the arms may provide for this without having to remove the food completely from the heat. Alternatively, fire feeding 51 may be accomplished by disengaging the dish subassembly 20, as shown in FIG. 2 with disassembled assembly 50.

Figure 8:
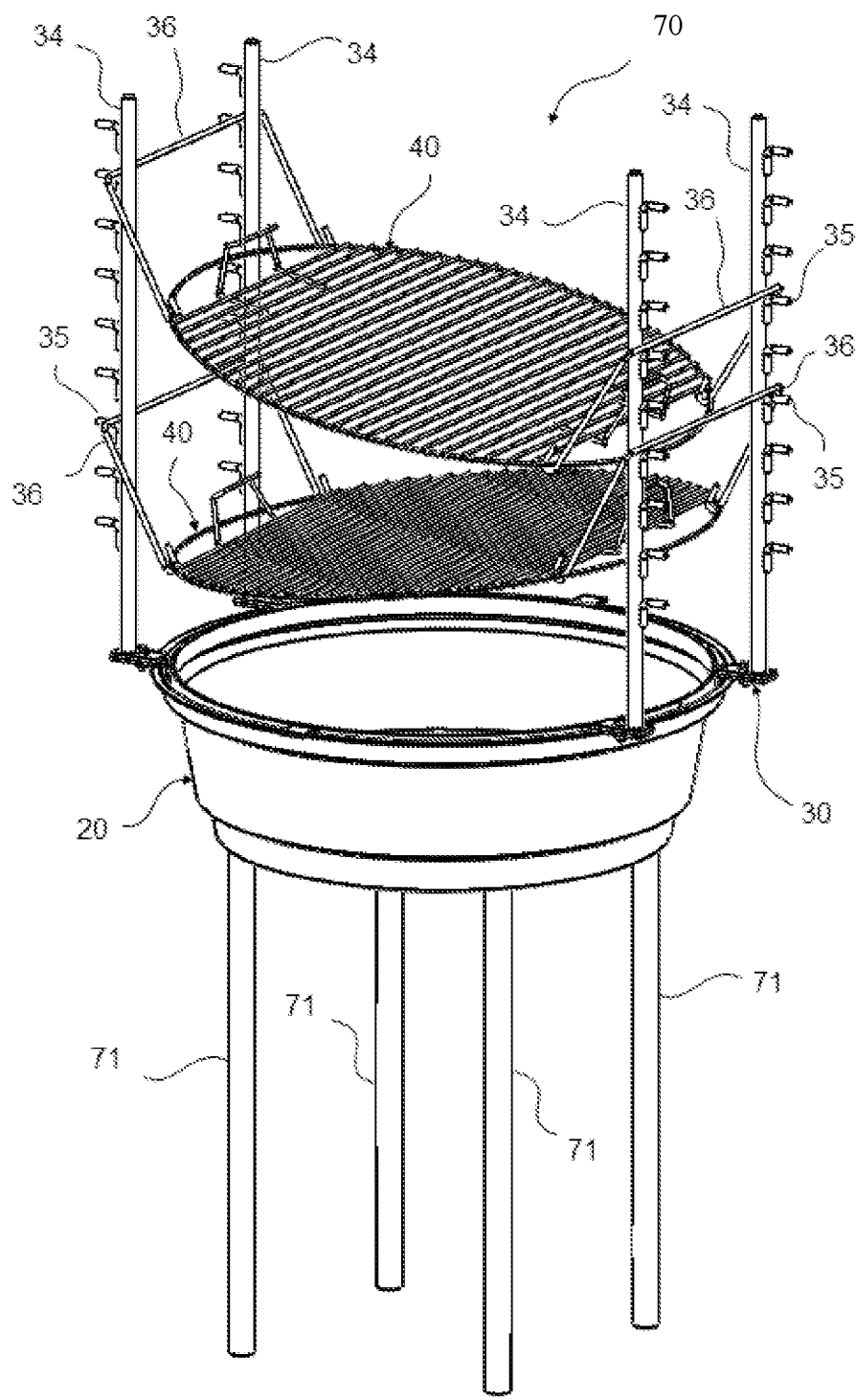
FIG. 8 is a perspective view of one embodiment of the present disclosure.

As shown in FIGS. 8 and 10, multiple grill rack subassemblies 40 may be engaged with the rack holder subassembly simultaneously. Moreover, the grilling rack subassemblies 40 may either be positioned such that the grilling surface is planar or parallel to the ground or such that the grilling surface is slanted. In fact, the grilling rack subassemblies 40 may be elevated over any selectable or desired heights. Rising the subassemblies 40 high enough allows the fire to be fed and the food temperature to be lowered. Lowering the rack raises the food temperature. Moreover, because of the positioning of the hangers, the subassemblies 40 may be able to be moved without risking burning the user's hands. While the device is described above as being used with a charcoal grill heat source, any desired heat source may be used.

The device of the present disclosure may be made of any desired or suitable materials and, in some embodiments, comprises steel or aluminum. Moreover, while the Figures depict the device as having a substantially circular shape, the device may be made to be any shape or size.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A grilling accessory for moving a cooking surface vertically up and down with respect to a heat source, the grilling accessory comprising:
    a rack holder subassembly designed to be positioned proximate to a heat source, the rack holder subassembly comprising:
        a base frame;
        at least two pairs of arms extending from the base frame, wherein:
            each pair of arms comprises two substantially parallel arms;
            each of the arms comprises an elongate arm having a bottom end attached to the base frame and a free top end, such that a pair of the arms creates a U-shape when the arms are positioned for cooking; and
        a plurality of grill rack supports extending from each of the arms away from a central area of the rack holder subassembly; and
    a grilling rack subassembly designed to support food items and engage with the rack holder subassembly, the grilling rack subassembly comprising:
        a grill grate comprising grilling bars; and
        a pair of hangers extending from the grill grate, the pair of hangers designed to engage with the plurality of grill rack supports.

2. The grilling accessory of claim 1, further comprising a dish subassembly sized to house the heat source, the dish subassembly comprising:
    a dish bottom;
    a dish wall extending upward from the dish bottom; and
    a dish lip defining atop edge of the dish wall,
    wherein the rack holder subassembly is removably engaged with the dish lip.

3. The grilling accessory of claim 2, wherein the rack holder subassembly comprises a plurality of plate rack holders designed to engage with the dish lip.

4. The grilling accessory of claim 3, wherein each of the plurality of plate rack holders comprises a blade with a plurality of angled recesses sized to accommodate at least one hanger of the pair of hangers.

5. The grilling accessory of claim 4, wherein the blade extends upward from a fastener designed to engage with the dish lip.

6. The grilling accessory of claim 5, wherein the fastener comprises a vise clip.

7. The grilling accessory of claim 1, wherein each of the at least two pairs of arms extends substantially perpendicularly from a fixture and each fixture extends outward from the base frame.

8. The grilling accessory of claim 7, wherein:
    a bottom of each of the arms is permanently attached to a base plate;
    each fixture comprises a clip plate permanently attached to, and extending outwards from, the base frame; and
    the base plate is removably attached to the clip plate with a fastener.

9. The grilling accessory of claim 1, wherein each of the arms are structurally identical.

10. The grilling accessory of claim 1, an elongate plane of the base frame is perpendicular to an elongate plane of each of the arms when each of the arms are extended upwards for cooking.

11. A grilling accessory for moving a cooking surface vertically up and down with respect to a heat source, the grilling accessory comprising:
    a rack holder subassembly designed to be positioned proximate to a heat source, the rack holder subassembly comprising:
        a base frame;
        a plurality of extensions extending therefrom; and
        at least two holder tower assemblies attached to the base frame, wherein each tower holder assembly comprises:
            a pair of substantially parallel notched holder arms hingeably attached to a base plate, wherein each of the arms comprises an elongate arm having a bottom end attached to the base frame and a free top end, such that a pair of the arms creates a U-shape when the arms are positioned for cooking; and
            a stiffener plate extending between the pair of notched holder arms proximate to the bottom end of each arm; and
    a grilling rack subassembly designed to support food items and engage with the rack holder subassembly, the grilling rack subassembly comprising:
        a grill grate comprising grilling bars; and
        a pair of hangers extending from the grill grate, the pair of hangers designed to engage with the notched holder arms.

12. The grilling accessory of claim 11, wherein:
    the base plate comprises a pair of plates extending upward from an outer edge of the base plate, wherein each of the pair of plates comprises a pair of pin orifices designed to engage with a lock pin assembly that also engages with the notched holder arms.

* * * * *